(12) United States Patent
Yoshitomi

(10) Patent No.: US 12,493,440 B2
(45) Date of Patent: Dec. 9, 2025

(54) INFORMATION PROCESSING APPARATUS, INFORMATION PROCESSING SYSTEM, CONTROL METHOD, AND PROGRAM

(71) Applicant: Lenovo (Singapore) Pte. Ltd., Singapore (SG)

(72) Inventor: Keiichi Yoshitomi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 23 days.

(21) Appl. No.: 18/415,890

(22) Filed: Jan. 18, 2024

(65) Prior Publication Data

US 2024/0256207 A1 Aug. 1, 2024

(30) Foreign Application Priority Data

Jan. 27, 2023 (JP) ................................ 2023-010922

(51) Int. Cl.
*G06F 3/14* (2006.01)
*G06F 3/0354* (2013.01)
*G06F 3/147* (2006.01)

(52) U.S. Cl.
CPC ........ *G06F 3/1446* (2013.01); *G06F 3/03543* (2013.01); *G06F 3/147* (2013.01)

(58) Field of Classification Search
CPC .... G06F 3/1446; G06F 3/03543; G06F 3/147; G06F 3/038; G06F 3/1423; G06F 3/04892; G09G 2354/00; G09G 3/3208; G09G 3/344; G09G 3/36
See application file for complete search history.

(56) References Cited

U.S. PATENT DOCUMENTS

2011/0063210 A1* 3/2011 Yamada ................. G09G 3/344
345/157

FOREIGN PATENT DOCUMENTS

| CN | 206470737 U | 9/2017 |
|----|-------------|--------|
| JP | 2011-65422 A | 3/2011 |
| JP | 2015-64421 A | 4/2015 |

* cited by examiner

*Primary Examiner* — Abhishek Sarma
(74) *Attorney, Agent, or Firm* — Osha Bergman Watanabe & Burton LLP

(57) ABSTRACT

An information processing apparatus includes a system device that, based on operation information input from an input device, identifies a target display device. The target display device is a display device as an object of display, from a plurality of display devices having different display speeds and target coordinates, which are coordinates in the target display device, based on operation information input from the input device, and displays a cursor at the target coordinates. The system device displays the cursor more prominently for a target display device having a display speed not higher than a predetermined speed than for a target display device having a display speed exceeding the predetermined speed.

8 Claims, 5 Drawing Sheets

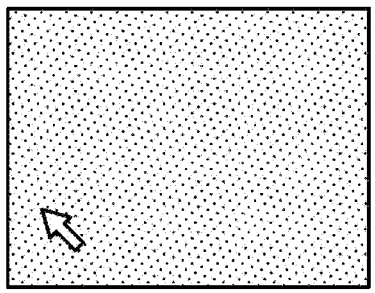
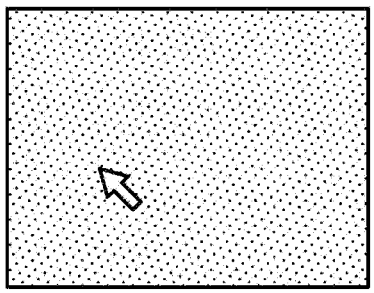
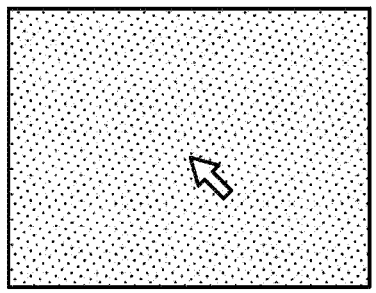
FIG. 6A  FIG. 6B  FIG. 6C
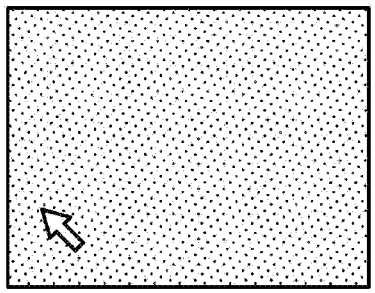
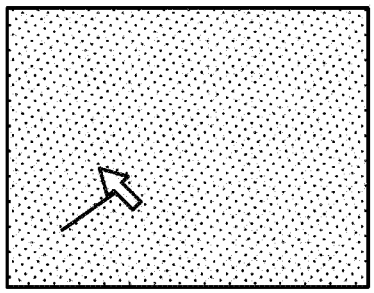
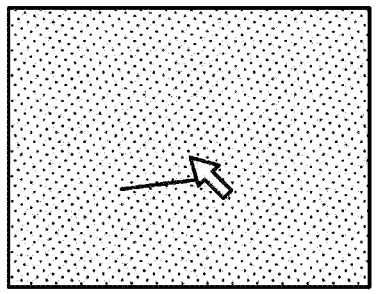
FIG. 7A  FIG. 7B  FIG. 7C
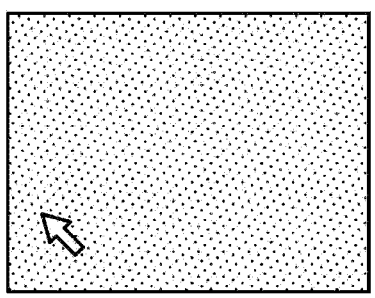
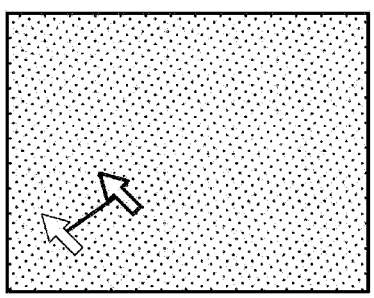
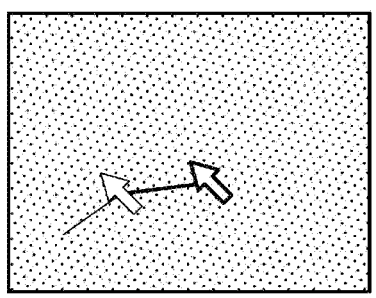
FIG. 8A  FIG. 8B  FIG. 8C

INFORMATION PROCESSING APPARATUS, INFORMATION PROCESSING SYSTEM, CONTROL METHOD, AND PROGRAM

CROSS-REFERENCE TO RELATED APPLICATIONS

This application claims priority to Japanese Patent Application No. 2023-010922 filed on Jan. 27, 2023, the contents of which are hereby incorporated herein by reference in their entirety.

BACKGROUND OF THE INVENTION

Field of the Invention

The present invention relates to an information processing apparatus, an information processing system, a control method, and a program, and, for example, to operation input to a display screen.

Description of the Related Art

An electrophoretic display (EPD) is composed of a flexible material having plasticity. The EPD is also called an electronic paper display, an electronic ink (E-Ink) display, or the like. The EPD consumes less power and has higher visibility than other types of display devices (for example, liquid crystal display (LCD), organic electroluminescence display (OLED: Organic Luminescence Display), and the like). The EPD is favored by users who do not require advanced display functions such as text editing, programing, and the like. Japanese Unexamined Patent Application Publication No. 2015-064421 describes that power consumption can be suppressed by adopting an EPD as a display device in information processing apparatuses such as various portable information processing terminals, wearable information processing terminals, electronic point of purchase (POP) advertising, electronic shelf labels, electronic posters, and the like.

However, the EPD suffers larger drawing delays than the other types of display devices. For example, the EPD has a refresh rate of typically about 5 to about 10 Hz. On the other hand, the LCD and OLED have refresh rates of 60 to 200 Hz. Although the degradation in operability at the refresh rate of about 5 to about 10 Hz may be acceptable for text editing, it may not be acceptable for operation input using a pointing device (for example, drawing of a given figure).

One of the reasons for the above is that in the operation input using a pointing device, the position instructed by an operation is a relative position from a certain reference point, not an absolute position that is directly instructed. A host system typically identifies target coordinates based on an operation with the pointing device, and displays a cursor at the target coordinates on the display device to guide to that position. The host system acquires information on the target coordinates and uses the information for various processes (for example, drawing process). In the case where an EPD is used as a display device, the low refresh rate may cause a cursor to be displayed with a delay from the target coordinates determined in response to the operation, and furthermore, the display of the cursor may continue at a plurality of target coordinates at different positions (afterimages). This may cause the valid cursor to be lost, hindering grasping of the valid target coordinates. This leads to degradation in operability, which is noticeable when the speed of movement by the operation is high.

It should be noted that the position instructed by operating an electronic pen, using a touch sensor superimposed on the EPD, corresponds to the absolute position, which is used for various processes in the host system. Although there is a delay between the contact and the display, the tip of the electronic pen that is in contact with the touch sensor is immediately visible. In this case, the display is expected to change to the instructed position, so the degradation in operability is not as significant as in the case where the pointing device is used to instruct the cursor position.

SUMMARY OF THE INVENTION

An information processing apparatus according to the first aspect of the present invention includes: a system device that, based on operation information input from an input device, identifies a target display device, which is a display device as an object of display, from a plurality of display devices having different display speeds and target coordinates, which are coordinates in the target display device, and displays a cursor at the target coordinates, wherein the system device displays the cursor more prominently for a target display device having a display speed not higher than a predetermined speed than for a target display device having a display speed exceeding the predetermined speed.

In the information processing apparatus described above, the system device may display a trajectory passing through the target coordinates for the target display device having the display speed not higher than the predetermined speed.

The plurality of display devices described above may include at least one electrophoretic display, and one of a liquid crystal display and an organic light emitting diode display.

In the information processing apparatus described above, the input device may include a pointing device.

An information processing system according to the second aspect of the present invention may include: the plurality of display devices; and the information processing apparatus according to the first aspect of the present invention.

A program according to the third aspect of the present invention may be a program for causing a computer to function as the information processing apparatus according to the first aspect of the present invention.

A control method according to the fourth aspect of the present invention is a control method for an information processing apparatus that, based on operation information input from an input device, identifies a target display device, which is a display device as an object of display, from a plurality of display devices having different display speeds and target coordinates, which are coordinates in the target display device, and displays a cursor at the target coordinates, wherein the method includes the step, performed by the information processing apparatus, of: displaying the cursor more prominently for a target display device having a display speed not higher than a predetermined speed than for a target display device having a display speed exceeding the predetermined speed.

The above-described aspects of the present invention can improve the operability of an input device at the time of using a display device having a low display speed.

BRIEF DESCRIPTION OF THE DRAWINGS

FIGS. 6A-6C are diagrams illustrating a first example of a display mode according to one or more embodiments;

FIGS. 7A-7C are diagrams illustrating a second example of the display mode according to one or more embodiments; and FIGS. 8A-8C are diagrams illustrating a display example of a cursor according to one or more embodiments.

DETAILED DESCRIPTION OF THE INVENTION

Figure 1:
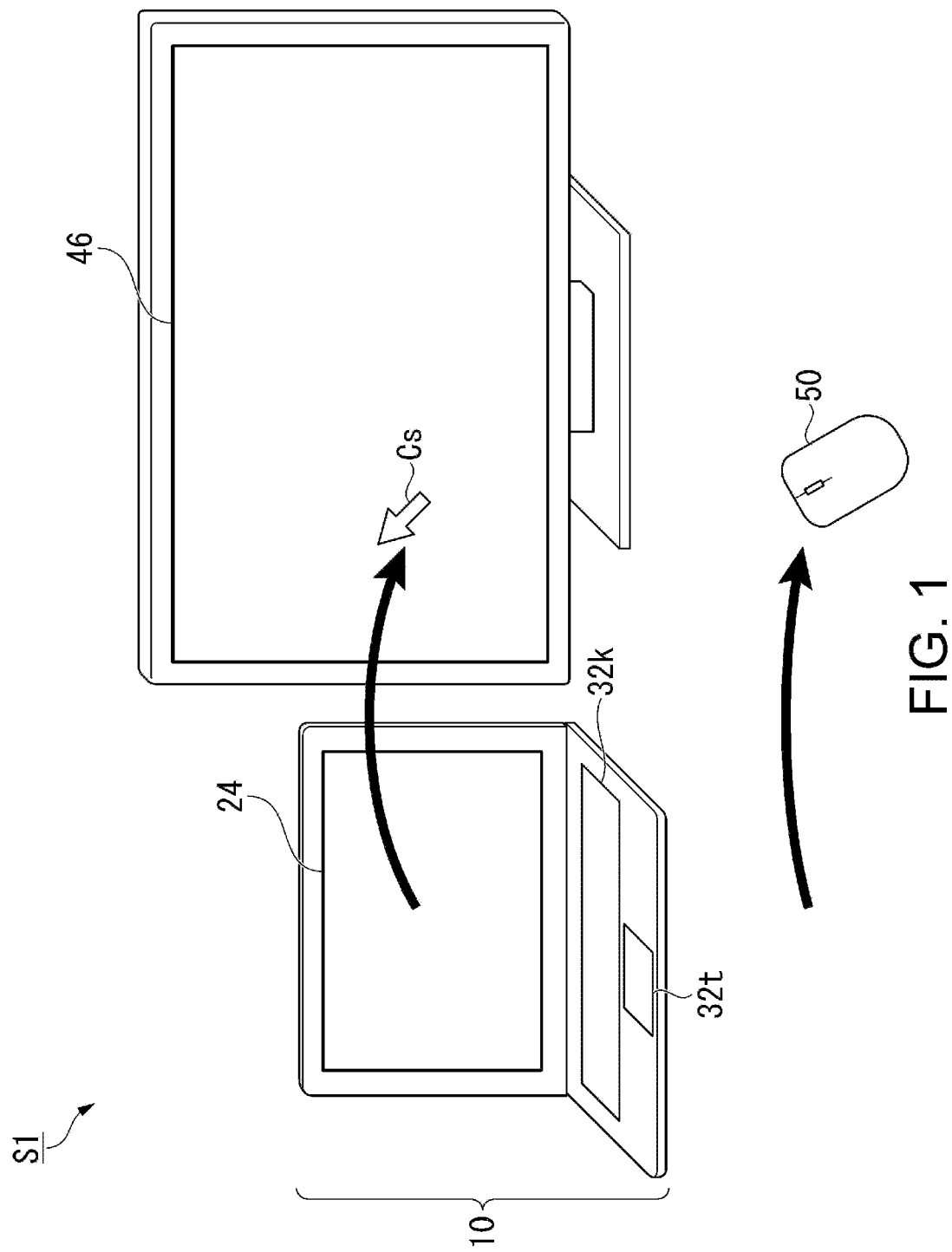
FIG. 1 is a diagram illustrating an overview of an information processing system according to one or more embodiments of the present invention.

Embodiments of the present invention will be described below with reference to the drawings. Firstly, an overview of an information processing system S1 according to one or more embodiments of the present invention will be described. FIG. 1 is a diagram illustrating an overview of the information processing system S1 according to one or more embodiments.

The information processing system S1 includes an information processing apparatus 10, a display device 46, and an input device 50. In the example in FIG. 1, the information processing apparatus 10 is a laptop personal computer (herein, called "laptop PC"). The information processing apparatus 10 includes a display device 24.

The information processing system S1 as a whole includes two display devices 24 and 46. The display devices 24 and 46 can each display a display screen in accordance with various display data input from the information processing apparatus 10. The input device 50 notifies the information processing apparatus 10 of operation information indicating a relative position instructed by an operation. The display device 46 is provided separately from the information processing apparatus 10, and the display device 24 is included in the information processing apparatus 10. The display devices 24 and 46 differ in type. In the example in FIG. 1, the display device 24 is a liquid crystal display (LCD). The display device 46 is an electrophoretic display (EPD). Therefore, the display speed of the display device 46 is lower than the display speed of the display device 24.

The input device 50 is a pointing device for accepting a user operation and instructing an input position or a position on a display screen. The input device 50 may be, for example, a mouse, touch panel, joystick, or the like. However, the input device 50 according to the present invention does not include a touch sensor superimposed on one or each of the display devices 24 and 46. Such a touch sensor is configured as a touch panel that is integrated with one or each of the display devices 24 and 46. A position in contact with a user's finger, stylus, or other operating object is directly acquired as an absolute position. In the example of FIG. 1, the input device 50 is a mouse. The input device 50 outputs the operation information indicating the instructed position to the information processing apparatus 10 in a wireless or wired manner.

The information processing apparatus 10, based on the operation information input from the input device 50, selects one of the display devices 24 and 46 as a target display device as an object of display, and identifies the coordinates instructed in the selected target display device as target coordinates. The information processing apparatus 10 displays a cursor at the identified target coordinates. The cursor is a mark that indicates the position instructed in response to an operation of the input device 50. Based on the identified target coordinates, the information processing apparatus 10 performs instructed processing in various programs. The processing to be performed includes, for example, drawing input (so-called handwriting input), and instructions of screen components (user interface (UI) components, for example, buttons, icons, and the like) or their parts.

The information processing apparatus 10 determines a drawing mode (display mode) of the drawing process based on the display speed of the selected target display device. The information processing apparatus 10 causes the cursor to be displayed more prominently for a target display device with a low display speed. In the example in FIG. 1, the display device 46 is selected as the target display device. The display speed of the display device 46 is lower than the display speed of the display device 24. The cursor Cs is displayed more prominently and more noticeably on the display device 46 than on the display device 24.

Indicators of the display speed used include the type of the display device instructed as the target display device, for example, the distinction between LCD, EPD, organic light emitting diode (OLED) display and the like, and the refresh rate of the display device.

It should be noted that in the present invention, "execution of a program" or "to execute a program", such as an application program (called "application" or "app"), device driver, firmware, operating system (OS), or the like, means that a processor 11 of the information processing apparatus 10, or other hardware, executes the processing instructed by commands described in the program.

Figure 2:
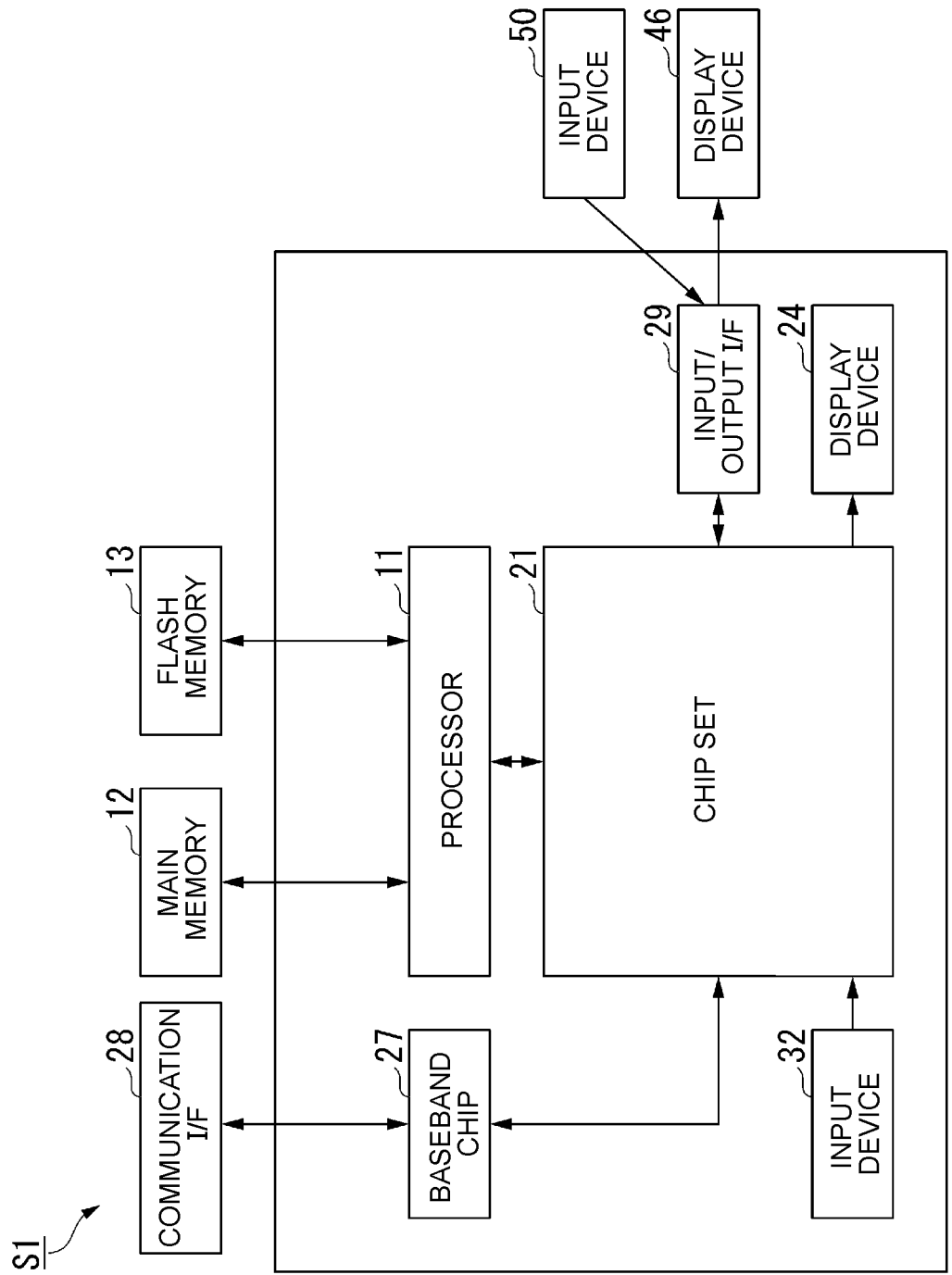
FIG. 2 is a schematic block diagram illustrating a hardware configuration example of an information processing apparatus according to one or more embodiments.

An example of the hardware configuration of the information processing apparatus 10 will now be described. FIG. 2 is a schematic block diagram illustrating a hardware configuration example of the information processing apparatus 10 according to one or more embodiments.

The information processing apparatus 10 includes a processor 11, a main memory 12, a flash memory 13, a chip set 21, the display device 24, a baseband chip 27, a communication interface (I/F) 28, an input/output I/F 29, and an input device 32.

The processor 11 controls functions of the entire information processing apparatus 10. For the processor 11, one or more central processing units (CPUs), for example, are applied. The processor 11 executes a predetermined program, and cooperates with the main memory 12 and other hardware to perform the functions of a host system 100 (described later).

The main memory 12 is a writable memory used as a work area of the processor 11, i.e., an area for reading a program to be executed and various setting data, and an area for writing processing data acquired through execution of the program. The main memory 12 is composed of a plurality of dynamic random access memory (DRAM) chips, for example. The program to be executed may be any of, or any combination of, OS, various device drivers for controlling peripheral devices and the like, various services/utilities, applications, and the like.

The processor 11 and the main memory 12 function as a system device that forms a core computer system, i.e. a host system, of the information processing apparatus 10. The computer system of the information processing apparatus 10 is configured with the system device as hardware, and software such as OS, a scheduling task, and the like.

The flash memory 13 stores various programs and data. The various programs include, for example, firmware, device drivers, services/utilities, and applications. These programs are executed by the processor 11. The data stored include data to be processed by the processor 11, and data generated by the processing. The data generated include final data, and may also include intermediate data used in steps following a given step.

The chip set 21 includes one or more controllers for connection to a plurality of devices so as to be able to input and output various data. The chip set 21 includes, for example, any one or a combination of bus controllers such as Universal Serial Bus (USB), serial Advanced Technology Attachment (ATA), Serial Peripheral Interface (SPI) bus, Peripheral Component Interconnect (PCI) bus, PCI-Express bus, and Low Pin Count (LPC). The plurality of devices to be connected include, for example, the display device 46 and the input device 50.

The display device 24 displays a display screen in accordance with various display data input from the processor 11 via the chip set 21. In the examples of FIGS. 1 and 2, the display device 24 is included in the information processing apparatus 10. On the display screen, a mark representing a predetermined form is represented at a position instructed by the input device 50.

The baseband chip 27 is a dedicated IC for controlling communications using the communication I/F 28. The baseband chip 27 realizes communications using, for example, a public wireless communication system such as 4G (fourth-generation wireless communication system) or 5G (fifth-generation wireless communication system), and a local wireless communication network as specified in IEEE802.11. The baseband chip 27, under the control of the processor 11, uses the communication I/F 28 to connect to other apparatuses via a communication network for transmission and reception of various data.

The communication I/F 28 connects to a communication network in a wireless or wired manner so as to be able to transmit and receive various data. The communication I/F 28 may include an antenna for transmitting and receiving radio waves used for wireless communication.

The input/output I/F 29 includes an interface that connects to other devices in a wireless or wired manner to enable input and output of various data using a predetermined input/output system. For example, the input/output I/F 29 can use a wired input/output system such as USB or High-Definition Multimedia Interface (HDMI) (registered trademark), or a wireless input/output system as specified in IEEE802.15.1 or the like.

The input device 32 accepts a user operation, and outputs operation information instructed by the accepted operation to the processor 11 via the chip set 21. A keyboard 32k and a touch pad 32t illustrated in FIG. 1 correspond to the input device 32. A position may be instructed by an operation on the touch pad 32t. In the following description, the case where a position is instructed mainly using the input device 50 will be given as an example.

Figure 3:
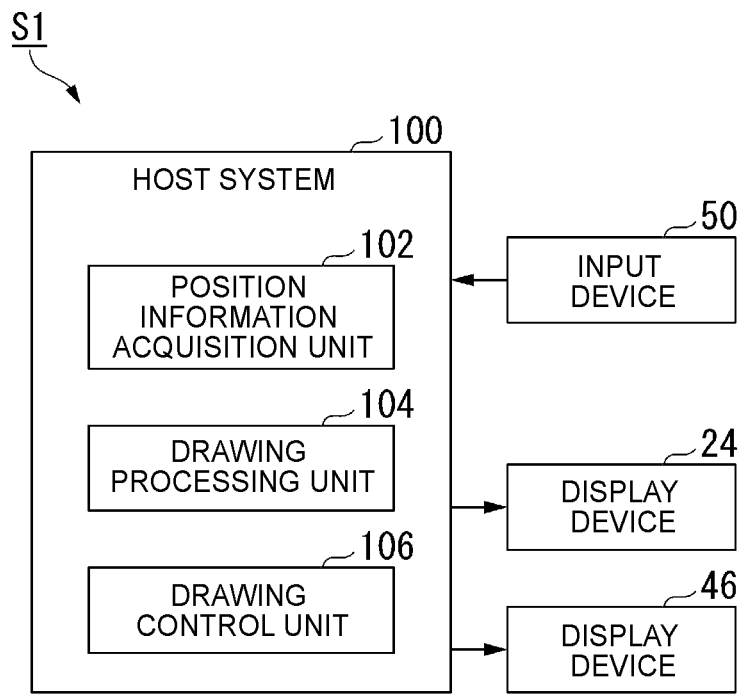
FIG. 3 is a block diagram illustrating a schematic configuration example of the information processing system according to one or more embodiments.

An example of the functional configuration of the information processing system S1 according to one or more embodiments will now be described. FIG. 3 is a block diagram illustrating a schematic configuration example of the information processing system S1 according to one or more embodiments.

The information processing system S1 includes a host system 100, the input device 50, and two display devices 24 and 46.

The host system 100 includes a position information acquisition unit 102, a drawing processing unit 104, and a drawing control unit 106.

The position information acquisition unit 102 determines a target display device and target coordinates based on a relative position instructed by operation information that is input from the input device 50 at regular intervals (of, for example, 20 to 200 ms). The position information acquisition unit 102 outputs target display device information indicating the determined target display device to the drawing processing unit 104 and the drawing control unit 106, and outputs target coordinate information indicating the target coordinates to the drawing processing unit 104.

The relative position corresponds to the displacement from a reference point in a virtual screen space. For the reference point, the origin of the virtual screen space or the target coordinates at the time of most recent shutdown are applied. The virtual screen space is a space that includes a predetermined virtual screen in the host system 100. The virtual screen includes a group of display areas composed of the display areas of the respective display devices 24 and 46 arranged adjacent to each other without overlapping. An example of the virtual screen will be described later. The target coordinates represent one point in the virtual screen space. Thus, the target coordinates indicate a position inside a display area of one of the display devices 24 and 46, or a position outside the display areas of both display devices 24 and 46. The position information acquisition unit 102 can determine the display device having the display area including the position instructed by the target coordinates as the target display device. In the case where the target coordinates indicate a position outside the display areas of both display devices 24 and 46, it can be judged to be undefined (error).

The drawing processing unit 104 performs a display on one of the display devices 24 and 46 based on target coordinate information and target display device information input from the position information acquisition unit 102 and display mode information input from the drawing control unit 106. The drawing processing unit 104 identifies the target display device instructed by the target display device information and the target coordinates instructed by the target coordinate information. The drawing processing unit 104 identifies the display mode instructed by the display mode information input from the drawing control unit 106. The drawing processing unit 104 generates a display screen by placing a cursor expressed in the identified display mode at the target position instructed by the target coordinates in the display area of the identified target display device. The drawing processing unit 104 outputs display data representing the acquired display screen to the target display device. Thus, the drawing processing unit 104 is capable of displaying the cursor in the identified display mode, at the target position in the display area of the target display device.

The drawing control unit 106 determines the cursor display mode in response to the input from the position information acquisition unit 102. The drawing control unit 106 identifies the target display device indicated in the target coordinate information. The drawing control unit 106 has display speed information preset therein, which indicates the display speed for each display device connected to the system. As an indicator of the display speed, a refresh rate, for example, can be used. The drawing control unit 106 refers to the display speed information to identify the display speed of the identified target display device. For example, the drawing control unit 106 selects a display mode 1 for the target display device having the display speed exceeding a predetermined display speed threshold value. The display mode 1 corresponds to a normal display manner. The drawing control unit 106 selects a display mode 2 for the target display device having the display speed not higher than the display speed threshold value. The display mode 2 is a display mode in which a cursor is expressed more prominently than in the display mode 1. The drawing control unit 106 may have display mode information set therein, which indicates the display mode for each display speed, or for each value range of the display speed, and may determine the display mode information corresponding to the identified display speed. In the display mode information, a lower display speed is associated with a display mode that enables the cursor to be expressed more prominently. Specific examples of the display mode will be described later. The drawing control unit 106 outputs the display mode information indicating the selected display mode to the drawing processing unit 104.

The drawing processing unit 104 may compose a display screen by placing the cursor on a background screen that is displayed on the target display device in accordance with an instruction from another running program. For the background screen, a screen that displays a cursor to represent the target coordinates, thus realizing the operation input, can be applied. Examples of the screen applicable to the background screen include a screen for handwriting input for generating a figure based on the trajectory of the target coordinates, a screen for input of numerical values or characters based on the operation information, and a setting screen for selection of options.

The program that instructs the functions of the position information acquisition unit 102, the drawing processing unit 104, and the drawing control unit 106 may be configured as one or more independent programs, or may have any type or form such as applications, utilities, application programming interface (API) functions, and the like. The processing of this program may be called from the processing of another running program, for example, a resident app. The resident app is an application that starts and runs concurrently with the OS.

Figure 5:
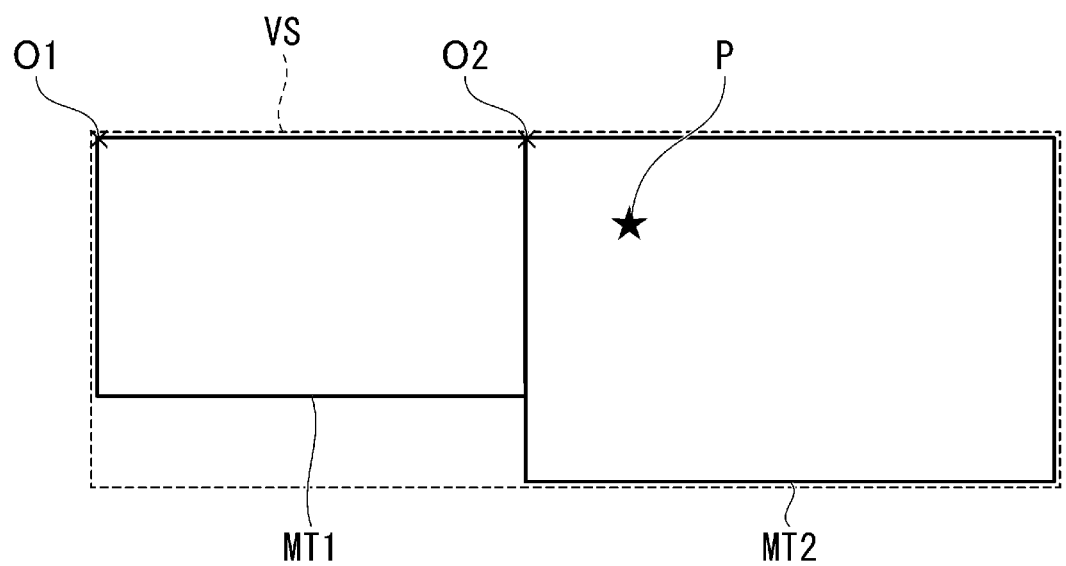
FIG. 5 is a diagram illustrating a virtual screen according to one or more embodiment.

An example of the virtual screen according to one or more embodiments will now be described. FIG. 5 is a diagram illustrating a virtual screen according to one or more embodiments. The virtual screen VS illustrated in FIG. 5 is a rectangular area that includes a display area MT1 for the display device 24 and a display area MT2 for the display device 46 adjacent to each other in the horizontal direction. The display device 24 incorporated in the information processing apparatus 10 is a primary display device. Each of the display areas MT1 and MT2 is a rectangular area, with its horizontal width and vertical height expressed by the number of pixels. The virtual screen VS has its origin O1 at the upper left corner. The display areas MT1 and MT2 have their origin O1 and O2 at the upper left corners, respectively. The virtual screen VS and the display area MT1 have a common origin O1. The display area MT1 has its entire right side in contact with a part of the left side of the display area MT2, forming a boundary between the display areas MT1 and MT2. The horizontal width of the virtual screen VS corresponds to the sum of the widths of the display areas MT1 and MT2. The vertical height of the virtual screen VS is equal to the height of the display area MT2. The individual display areas are also called monitor areas, and the virtual screen is also called a screen area, or the like.

The position information acquisition unit 102 recognizes display devices connected at the time of startup (i.e., boot, reboot, or the like) of the host system 100, and also at the times of connection or start of operation of the display devices. The position information acquisition unit 102 refers to display device information, which is set in advance, indicating the size of the display area for each model of display device, to identify the size of the display area for each recognized display device. The position information acquisition unit 102 can arrange the identified display areas sequentially in a certain direction such that one side of one of the display areas contacts one side of the other display area, and determine the smallest rectangle containing all the display areas as a virtual screen. The virtual screen occupies a series of display areas in which the individual display areas are spatially contiguous so as not to overlap each other. The user can operate the input device 50 to move the target coordinates across the boundaries of the display areas to thereby move the cursor Cs between a plurality of display devices (see FIG. 1).

The target coordinates represent a position within a virtual screen space that occupies the virtual screen VS, with the origin O1 as a reference, based on the operation information from the input device 50. The coordinates P illustrated in FIG. 5 are an example of the target coordinates. The coordinates P belong to the display area MT2. The position information acquisition unit 102 can determine the display device 46 pertaining to the display area MT2 as a target display device based on the coordinates P. The position information acquisition unit 102 converts the target coordinates determined in the virtual screen space into coordinate values in the target display device by subtracting the coordinates of the origin of that target display device, and makes the coordinate values obtained through the conversion included in the target coordinate information. The drawing processing unit 104 can identify the position of the cursor to be displayed on the target display device by using the coordinate values communicated in the target coordinate information as the target coordinates.

Specific examples of the display mode according to one or more embodiments will now be described. FIGS. 6A-6C are diagrams illustrating a first example of the display mode according to one or more embodiments. FIGS. 6A-6C illustrate a display screen that shows a cursor moving on a background screen in the normal display mode 1. In the example in FIGS. 6A-6C, the cursor is an outlined arrow pointing diagonally to the upper left. The movement of the cursor is represented by a time series of display positions. The order of the time series is FIG. 6A, FIG. 6B, and FIG. 6C, with FIG. 6C illustrating the display screen at the latest time. This shows the state where the cursor moves to the upper right with the lapse of time.

FIGS. 7A-7C are diagrams illustrating a second example of the display mode according to one or more embodiments. FIGS. 7A-7C illustrate a display screen that shows a cursor moving on a background screen in the display mode 2. In FIGS. 7A-7C, the same cursor as in FIGS. 6A-6C is expressed more prominently. In the example in FIGS. 7A-7C, the drawing processing unit 104 composes a display screen by placing the cursor at the latest target coordinates at the present time and also including a trajectory that passes through the past target coordinates within a prescribed period of time (of, for example, 0.2 to 0.5 s) up to the present time. The drawing processing unit 104 generates a line extending between the target coordinates adjacent in time, as the trajectory. The trajectory may be composed of line segments between the target coordinates, or a curve based on a predetermined geometric model (for example, Bezier curve, spline curve, or the like) passing through the target coordinates. At the beginning of the display on the display screen, no trajectory is represented, as illustrated in FIG. 7A. In each of FIG. 7B and FIG. 7C, the cursor is represented at the end of the trajectory.

FIGS. 8A-8C are diagrams illustrating a display example of a cursor according to one or more embodiments. While FIGS. 6A-6C and FIGS. 7A-7C illustrate display screens generated by the drawing processing unit 104, FIGS. 8A-8C illustrates a screen when the display screen illustrated in FIGS. 7A-7C is displayed using the display device 46, which is an EPD. The EPD experiences significant delays and afterimages compared to the other types of display devices. Thus, in FIG. 8A and FIG. 8B, the cursors displayed at the past target positions remain discretely, and the latest cursor has not reached the latest target position. However, the trajectory being displayed allows the user to easily find the cursor displayed at its end, and the user can recognize this cursor as the cursor that is placed at a position closest to the latest target position.

Figure 4:
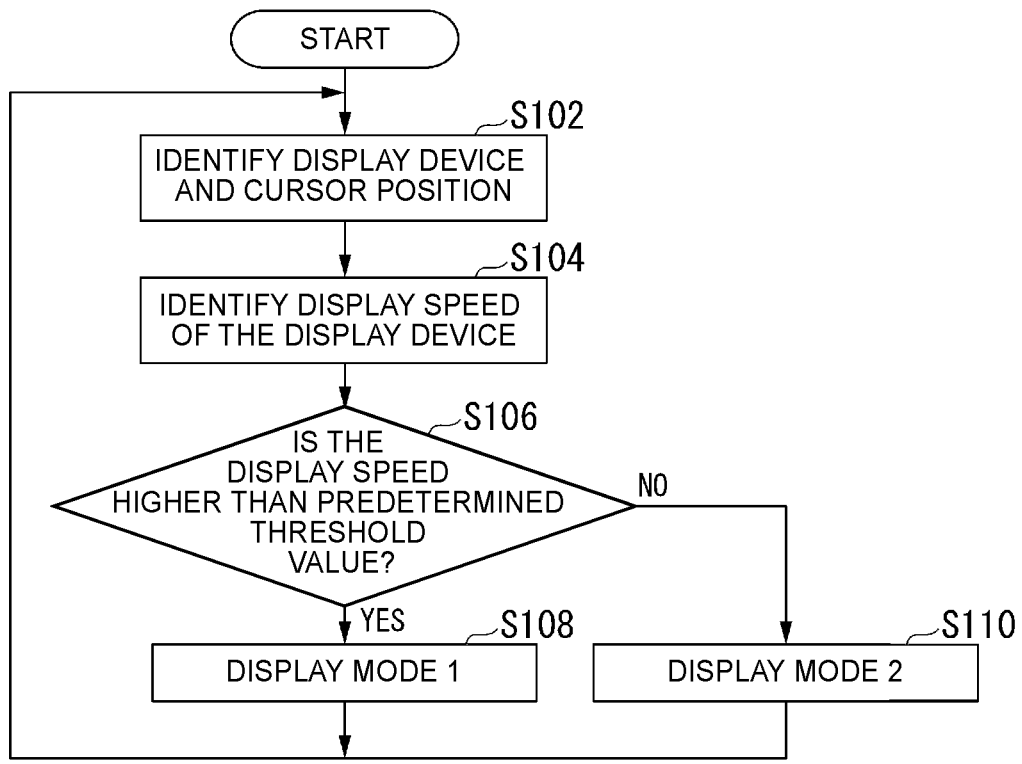
FIG. 4 is a flowchart illustrating a drawing process according to one or more embodiments.

An example of a drawing process according to one or more embodiments will now be described. FIG. 4 is a flowchart illustrating the drawing process according to one or more embodiments.

(Step S102) The position information acquisition unit 102 determines target coordinates on a virtual space composed of display areas of the respective display devices connected to each other, based on operation information input from the input device 50. The position information acquisition unit 102 determines the display device pertaining to the display area in which the determined target coordinates are located as the target display device, and determines the target coordinates in the display area as the cursor position.

(Step S104) The drawing control unit 106 refers to the display speed information set in advance, to determine the display speed of the determined target display device.

(Step S106) The drawing control unit 106 judges whether the determined display speed is higher than a predetermined display speed threshold value. If it is judged to be higher (YES in step S106), the process proceeds to step S108. If it is judged not to be higher (NO in step S106), the process proceeds to step S110.

(Step S108) The drawing control unit 106 determines the cursor display mode to be the display mode 1. The drawing processing unit 104 displays a display screen showing the cursor drawn in the display mode 1 on the target display device. The process then returns to step S102.

(Step S110) The drawing control unit 106 determines the cursor display mode to be the display mode 2. The drawing processing unit 104 displays a display screen showing the cursor drawn in the display mode 2 on the target display device. The process then returns to step S102.

While the case where the number of display devices in the information processing system S1 is two has been illustrated in the above example, it is not limited thereto. The number of display devices may be three or more. The plurality of display devices may all be provided separately from the information processing apparatus 10, or may all be integrated with the information processing apparatus 10.

Further, the information processing apparatus 10 is not limited to a laptop PC and may be implemented as an apparatus having another form, such as a desktop PC, a tablet terminal device, a multifunctional portable phone, a video projector, or the like.

While the case where there are two stages of display modes has been illustrated in the above description, it is not limited thereto. The number of stages of display modes may be three or more, and the prominence of the cursor display may differ for each stage of the display mode. Here, for each of the display mode stages, a higher display speed or a higher value range of the display speed may be associated with a display mode in which the cursor is displayed more prominently. The element constituting the cursor may be any one of or a combination of shapes, symbols, and characters. The cursor is not limited to the arrow shape and may be a square, star, or any other shape.

As described above, the information processing apparatus 10 according to one or more embodiments includes a system device (for example, the processor 11) that, based on operation information input from an input device, determines a target display device, which is a display device as an object of display, from a plurality of display devices having different display speeds and target coordinates, which are coordinates in the target display device, and displays a cursor at the target coordinates. The system device displays the cursor more prominently for a target display device having a display speed not higher than a predetermined speed than for a target display device having a display speed exceeding the predetermined speed.

The plurality of display devices may include at least one EPD, and one of an LCD and an OLED display.

As the input device, a pointing device may be applied.

One or more embodiments may be implemented as an information processing system S1 that includes the plurality of display devices and the information processing apparatus 10.

One or more embodiments may be implemented as a program for causing a computer to function as the information processing apparatus 10.

With the above configuration, one of the plurality of display devices is determined as a target display device based on the operation information, and a cursor is displayed at the target coordinates identified in the target display device. The cursor is displayed more prominently for a target display device having a display speed not higher than a predetermined speed than for a display device higher in display speed. The cursor being displayed prominently for a target display device of low display speed can reduce or eliminate the degradation in operability due to the loss of sight of the cursor.

The system device may display a trajectory passing through the target coordinates for the target display device having the display speed not higher than the predetermined speed.

With this configuration, the cursor is placed on the display screen at the end of the trajectory at that time. Even in the case of the occurrence of severe delays or afterimages on the display screen, a cursor as latest as possible can be easily identified from the positional relationship with the past cursors. This can reduce or eliminate the degradation in operability due to the loss of sight of the cursor.

While embodiments of the present invention has been described above in detail with reference to the drawings, the specific configurations are not limited to the above-described one or more embodiments and include the designs and the like within a range not departing from the gist of the present invention. The configurations described in the above one or more embodiments can be combined arbitrarily.

DESCRIPTION OF SYMBOLS

S1 information processing system
10 information processing apparatus 11 processor
12 main memory
13 flash memory
21 chip set
24 display device
27 baseband chip
28 communication I/F
29 input/output I/F
32, 50 input device
32*t* touch pad
32*k* keyboard
46 display device
100 host system
102 position information acquisition unit
104 drawing processing unit
106 drawing control unit

What is claimed is:

1. An information processing apparatus comprising:
a system device that,
based on operation information input from an input device, identifies a target display device, which is a display device as an object of display, from a plurality of display devices having different display speeds and target coordinates, which are coordinates in the target display device, and
displays a cursor at the target coordinates,
the system device displaying the cursor more prominently for a target display device having a display speed not higher than a predetermined speed than for a target display device having a display speed exceeding the predetermined speed.

2. The information processing apparatus according to claim 1, wherein the system device displays a trajectory passing through the target coordinates for the target display device having the display speed not higher than the predetermined speed.

3. The information processing apparatus according to claim 1, wherein the plurality of display devices include at least one electrophoretic display, and one of a liquid crystal display and an organic light emitting diode display.

4. The information processing apparatus according to claim 1, wherein the input device includes a pointing device.

5. An information processing system comprising:
the plurality of display devices; and
the information processing apparatus according to claim 1.

6. A non-transitory computer-readable medium storing instructions that, when executed by a computer, cause the computer to function as the information processing apparatus according to claim 1.

7. A control method for an information processing apparatus that, based on operation information input from an input device, identifies a target display device, which is a display device as an object of display, from a plurality of display devices having different display speeds and target coordinates, which are coordinates in the target display device, and displays a cursor at the target coordinates,
the control method comprising a step, performed by the information processing apparatus, of:
displaying the cursor more prominently for a target display device having a display speed not higher than a predetermined speed than for a target display device having a display speed exceeding the predetermined speed.

8. An information processing apparatus comprising:
a system device that:
receives operation information, from an input device, identifying target coordinates in a virtual space representing an area provided by a plurality of display devices that have different display speeds and are connected to the information processing apparatus,
selects a target display device from the plurality of display devices based on the target coordinates,
in response to selecting a target display device that has a display speed greater than a predetermined speed:
displays a cursor in the target display in a first display mode, and
in response to selecting a target display device that has a display speed less than or equal to the predetermined speed:
displays the cursor in the target display in a second display mode,
wherein the second display mode displays the cursor more prominently than the first display mode.

* * * * *